(12) United States Patent
Hammerbeck (10) Patent No.: US 7,549,357 B2
(45) Date of Patent: Jun. 23, 2009

(54) RATIO CHANGING METHOD AND APPARATUS

(76) Inventor: John P. R. Hammerbeck, Rawlings House, 2a Milner Street, London (GB) SW3 2PU ( * ) Notice: Subject to any disclaimer, the term of this patent is extended or adjusted under 35 U.S.C. 154(b) by 235 days.

(21) Appl. No.: 10/551,398

(22) PCT Filed: Apr. 5, 2004

(86) PCT No.: PCT/GB2004/001477
§ 371 (c)(1),
(2), (4) Date: Sep. 29, 2005

(87) PCT Pub. No.: WO2004/088166
PCT Pub. Date: Oct. 14, 2004

(65) Prior Publication Data
US 2006/0196306 A1  Sep. 7, 2006

(30) Foreign Application Priority Data
Apr. 4, 2003 (GB) ............................ 0307886.2
Sep. 16, 2003 (GB) ............................ 0321721.3

(51) Int. Cl.
*F16H 3/70* (2006.01)
(52) U.S. Cl. .................. 74/640; 475/166; 475/169; 475/175; 475/162
(58) Field of Classification Search ........... 475/162, 475/165, 166, 169, 175, 178, 334, 163, 177; 74/640
See application file for complete search history.

(56) References Cited

U.S. PATENT DOCUMENTS

| | | | | |
|---|---|---|---|---|
| 3,424,036 A | * | 1/1969 | Colgan | 475/180 |
| 3,427,898 A | * | 2/1969 | Mayer | 74/640 |
| 3,530,742 A | * | 9/1970 | Sfredda | 475/166 |
| 4,216,677 A | * | 8/1980 | Tuzson | 74/17.8 |
| 4,703,670 A | * | 11/1987 | Kondo | 74/640 |
| 4,884,473 A | | 12/1989 | Lew | |
| 5,080,638 A | * | 1/1992 | Osborn | 475/179 |
| 5,324,240 A | * | 6/1994 | Guttinger | 475/162 |
| 5,441,460 A | * | 8/1995 | Djudin | 475/149 |
| 5,876,298 A | * | 3/1999 | Kato et al. | 475/162 |
| 6,280,359 B1 | * | 8/2001 | Moskob | 475/149 |
| 6,453,772 B1 | * | 9/2002 | Moskob | 74/640 |
| 6,477,918 B2 | * | 11/2002 | Sakamoto | 74/640 |

FOREIGN PATENT DOCUMENTS

DE  4021923 A  1/1991

* cited by examiner

*Primary Examiner*—Sherry Estremsky
(74) *Attorney, Agent, or Firm*—Price, Heneveld, Cooper, DeWitt & Litton, LLP

(57) ABSTRACT

A ratio changing method and apparatus includes, in a hypocycle arrangement, an input drive wheel (2), an output drive wheel (3) and a transfer ring (1). The input drive wheel (2) drives around the exterior of the transfer ring (1). The transfer ring (1) is constrained against rotation about its own axis but oscillates about the outward drive wheel (3), in parting rotation to the output drive wheel (3) as a result a simple and effective ratio changing apparatus is provided.

24 Claims, 8 Drawing Sheets

RATIO CHANGING METHOD AND APPARATUS

The invention relates to a ratio changing method and apparatus.

Reduction of rotational frequency and, less commonly, generation or increase of rotational frequency are often required when linking a motor to a load. It is also useful to produce a variable output from a variable input. The present invention proposes to change rotational frequency and provide a continuously variable drive by a new variation on the oscillating hypocycloidal principle.

BACKGROUND

The hypocycloidal principle involves making a gear wheel "walk" round the inner circumference of a ring gear, or vice-versa, thus imparting a rotation to the other member that is counter to the direction of oscillation. Commercially available groups of reducers use a similar principle. The most common is the harmonic wave drive which uses a flexible geared spline which is pressed by an inner wave generator at opposite points against an outer fixed gear ring, thereby transferring rotation to the flexspine at high reduction ratios. The output rotates contrary to the input, which is advantageous because it reduces the reaction force required to be supplied by the mount. The layout is that an inner dual pressure wave input forces a flexible end of a cup shaped transfer ring against a fixed outer ring. Output is taken from the rigid bottom of the cup and is in a contra direction to the input. However, this type of reducer is expensive, the flexspine is subject to fatigue failure and it cannot be made continuously variable.

It is also known to use a non flexible hypocycloidal principle whereby the input is divided between two or more eccentric cams rotating within a ring having internal gears and causing it to wobble round an inner gear and so impart rotation to it. The layout is that multiple eccentrics rotate in holes in a ring with internal gears causing the ring to oscillate round an inner output gear, producing rotation contra to input direction. This design has low torsional wind up, but is complex and sliding of the eccentric cams make it inefficient.

A further type of hypocycloidal drive sometimes called a quadrant drive uses a cam on the input to cause a gear to wobble and roll round within a ring gear from which output is taken. The layout comprises an eccentric central input which rotates within a central gear wheel causing it to oscillate against the geared inner side of a fixed ring gear. The reaction produces a contra rotation in the oscillating gear. A further eccentric stage cancels the oscillation to produce simple rotation.

A further group is the cyclo drive. It employs an eccentric inner input to oscillate a central disc, which is restrained by outer rollers. The output means has roller pins, which extend into holes in the oscillating disc. Output is contra to input. This is essentially the same layout as the quadrant drive except that the eccentric output is cancelled by the roller pins on the output, rather than by a separate stage. This design is inherently expensive because of the large numbers of components and roller bearings.

The invention is set out in the claims. The invention provides a less complex and expensive layout than known approaches, can be employed in both friction and positive embodiments and can be used in both fixed ratios and continuously variable embodiments. Further advantages are set out in the following description.

Embodiments of the invention will now be described, by way of example, with reference to the drawings with which:

FIG. 1 is a schematic end view showing the general principle of an apparatus according to the present invention;

FIG. 2a shows a schematic end view of a first fixed ratio embodiment of the invention;

FIG. 2b shows a side view of the embodiment of FIG. 2a;

FIG. 3b shows a side view of the embodiment of FIG. 3a;

FIG. 4b shows a side view of the embodiment of FIG. 4a;

FIG. 5b shows a side view of the embodiment of FIG. 5a;

FIG. 6b shows a side view of the embodiment of FIG. 6a;

FIG. 7b shows a side view of the embodiment of FIG. 7a;

FIG. 10b is a schematic side view of the embodiment of FIG. 10a.

DESCRIPTION

Figures 1, 2A, 2B:
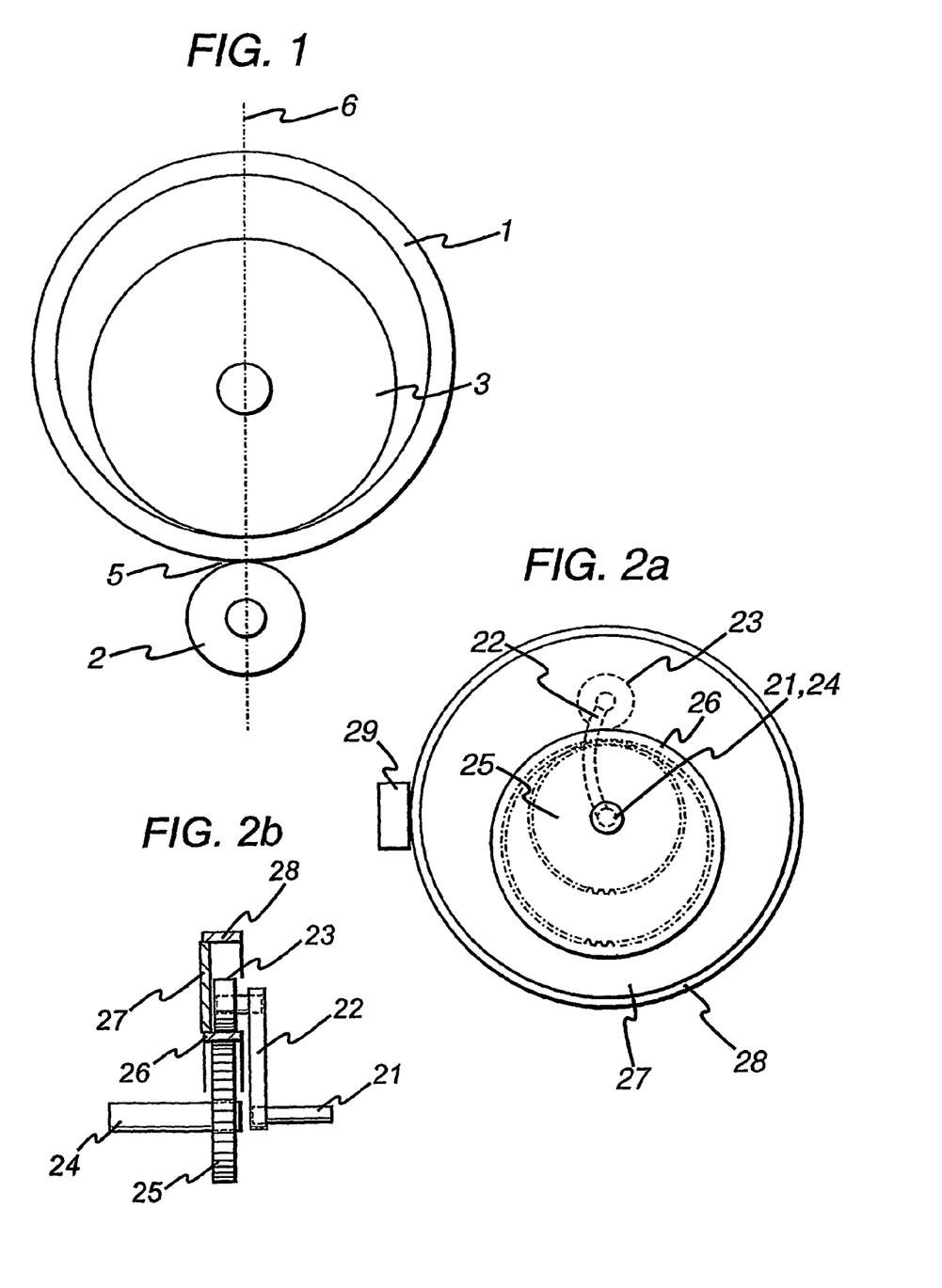

In overview the present invention employs a hypocycloidal means as shown in principle in FIG. 1 by oscillating a intermediate transfer ring (1) by means of a rotating pressure input embodied in a freely rotating wheel (2), that orbits around an input staff which is co-axial with an inner output (3) that is radially fixed but rotatable. The transfer ring is compliantly tethered by suitable means to prevent it rotating but allowing it to oscillate about the inner output (3). Increased leverage makes the force applied rise steeply when the pressure wheel (2) rotates and tries to force the contact point (5) with the intermediate ring (1) off a notional line (6) connecting the contact point and centres of the output wheel and the transfer ring causing the ring to oscillate and the output (3) to rotate. Output direction is contra to input. The rotating pressure may be on the outside of the transfer ring, pressing the transfer ring directly against the inner output wheel, or may act on the inside of the transfer ring, pressing outwards and forcing the opposite side of the transfer ring against the inner output wheel. Also the rotating pressure may consist of two or more pressure points on either side of the contact point between transfer ring and inner output wheel. Transfer of torque between the transfer ring and the output wheel may be by usual friction means or by positive means such as teeth or roller teeth.

The present invention is capable of being finely balanced because the input and the transfer ring move as one mass with unchanging weight distribution. Optional disconnection of output from input can be effected by moving the rotating pressure wheel or wheels away from the transfer ring, allowing the transfer ring to disengage from the output wheel. This is suitable for friction versions because of the ease of re-engagement between smooth surfaces. A method suited to both friction and geared output, is to release the tether on the transfer ring. In this method the transfer ring is attached by compliant means to a base that is selectively free to rotate (FIG. 1). When the base is allowed to rotate, the transfer ring rotates with the output and no torque is passed to the output. A brake applied to the rotating base stops the base rotating and torque is transferred to the output. The level of friction applied by the brake after lockup can be selected to give torque limiting overload protection.

The tethered transfer ring acts between the input and output to transfer torque. In a reversed system input is by oscillation of the central gear as in some known hypocycloidals and output taken from the ring gear. In such an embodiment the central gear becomes a transfer ring between the oscillating input and the ring gear and must be compliantly tethered in the manner generally discussed herein in order to pass torque.

Figure 4A:
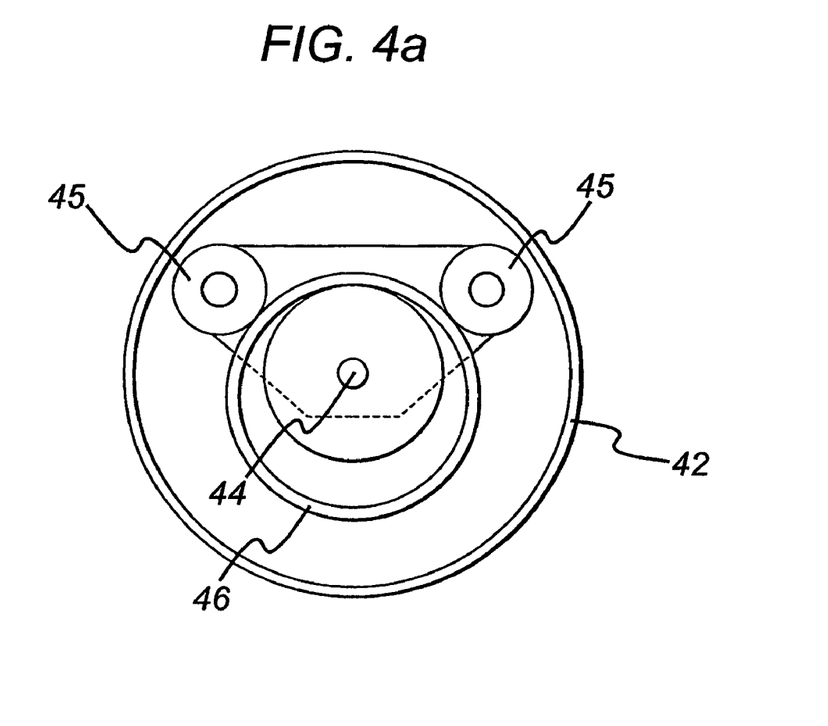
FIG. 4a shows a schematic end view of a third fixed ratio embodiment of the invention.
Figure 4B:
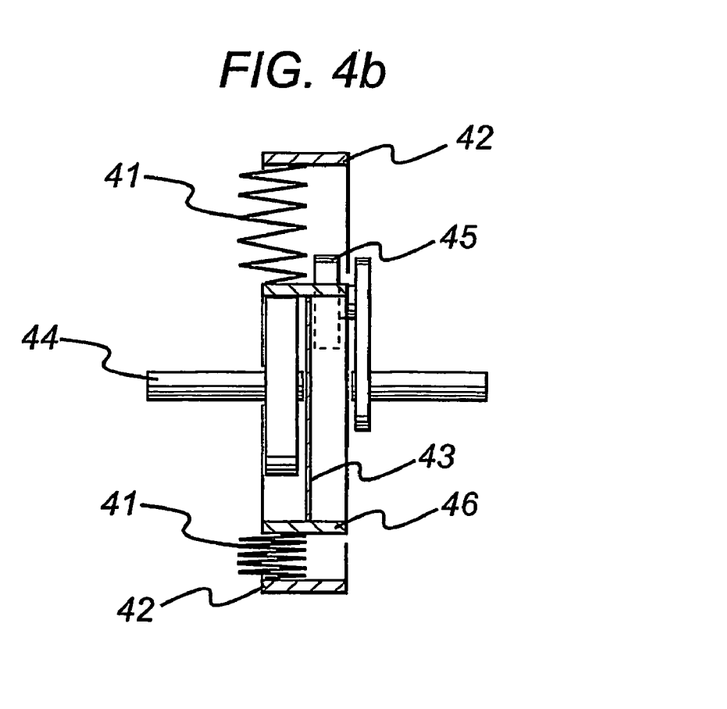

Input to the transfer ring can be to the outer circumference of the transfer ring or to an inner circumference of a transfer ring. The tether can be a compliant ring, tube, membrane. spring, bellows or other suitable compliant tether to prevent the transfer ring from rotating. The tether may act on the ring from a mount from any suitable direction, but radially outwards or inwards or co-axial with the output are most advantageous. Because the transfer ring can be sealed at the input end when input is to the outer circumference of the ring, or an internal partition (FIG. 4) can be supplied to divide the output side from the input side when input is to the internal circumference of the ring, the drive can pass rotary power without a rotating seal. Such ability is advantageous in industries processing volatile chemicals or foodstuffs because it prevents the passage of contaminants.

Simple lubrication can be effected by enclosing the transfer ring with a plate on one side and a flexible boot on the side from which output is taken (FIG. 4). This boot may form the tether. If the drive is by friction this can seal in a traction fluid. Because the ring wobbles and does not rotate the lubricant or fluid will drip to the bottom of the tether ring, where progressively different portions of the output gear dip into it on each oscillation of the transfer ring. Thus little lubricant is required, reducing losses associated with churning. A magnetic trap for wear particles may be placed at the base of the oscillating ring. The strength of the tethering forces at varying points around the transfer ring may be adjusted to account for any off balance mass of the lubricant.

Figure 3A:
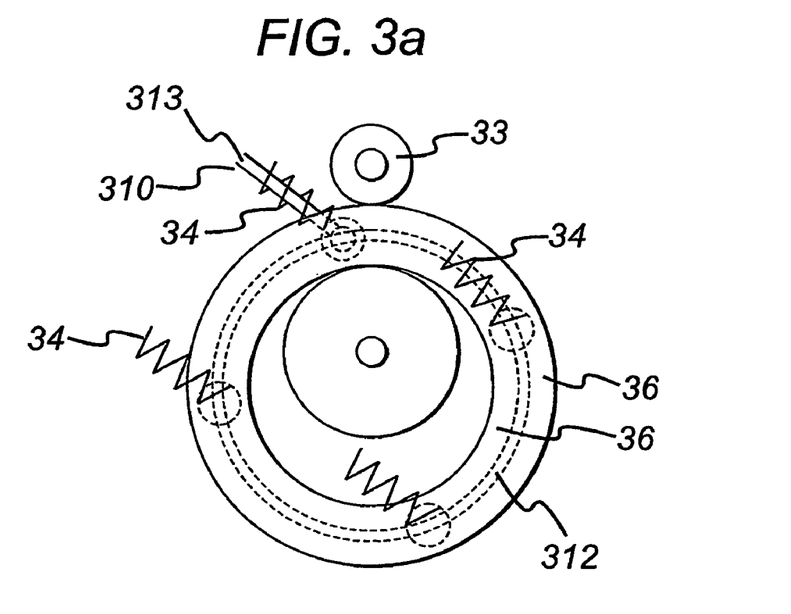
FIG. 3a shows a schematic end view of a second fixed ratio embodiment of the invention.
Figure 3B:
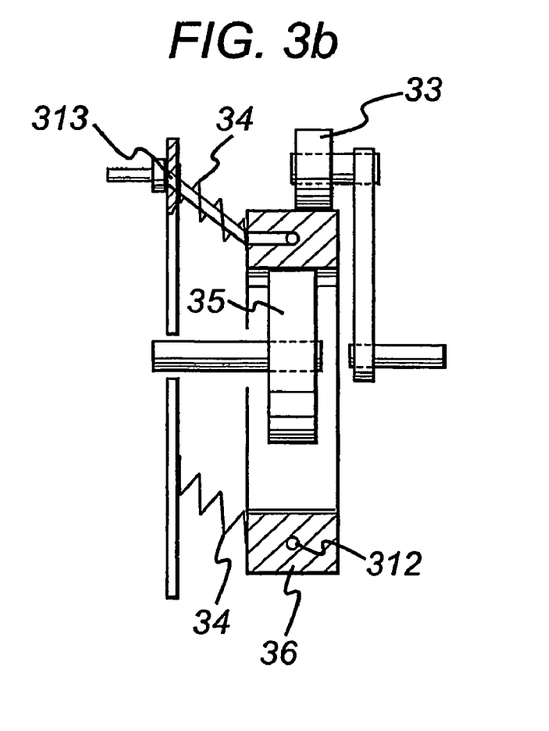

In more complex embodiments the transfer ring may be provided with internal channels or surface mounted tubes for the circulation of lubricant or cooling fluid (FIG. 3). Lubricant can be pumped efficiently by providing a open tube and one-way valve that is thrust into a lubricant pool under the transfer ring on the downward oscillations of the transfer ring. If cooling fluid is exchanged with an external heat exchanger the oscillation of the transfer ring will cause liquid in channels within or attached to the ring to be thrown in the direction of oscillation. Thus the drive provides its own pumping mechanism.

Turning to the specific embodiments in more detail, in a first simple fixed ratio geared embodiment (FIGS. 2a and 2b), there is provided an input drive element comprising an input shaft (21) fixedly mounted on which is a leaf spring beam (22) on the other end of which is mounted a freely rotating roller (23). An output drive element comprises an output shaft (24) co-axial with but independently rotatable of the input shaft (21) and mounted thereon a gear wheel (25). Between the gear wheel (25) and the roller (23) is sandwiched a transfer element comprising a substantially circular transfer ring (26) with internal gears. The transfer ring (26) is restrained from rotation by an elastic sheet (27) connected to a rotatable disc mount (28) which can be prevented from rotating by the application of a block brake (29). In operation the input shaft (21) rotates causing the roller (23) on the beam (22) to also rotate around the same axis. This applies a rising compliant pressure to one side of a notional line joining the contact point of the transfer ring and the output gear and their respective centres. This pressure acts on the transfer ring (26) in the manner of a lever against the fulcrum, which in this case is the contact point between the transfer ring and the output wheel. The further the pressure moves away from the contact point the greater the leverage. The transfer ring is prevented from rotating by the tethering sheet and cannot rotate, so the pressure forces the transfer ring to oscillate around the inner gear, following the roller (3), causing the inner gear (25) to rotate contra to the direction in which the pressure wheel is rolling. If the rotational force reaction in the transfer ring rises sufficiently to overcome the friction of the brake (29), the rotatable disc mount (28) will slip and rotate, the transfer ring will then rotate rather than wobble and no torque will be transmitted to the output. Slippage can be operator activated to de-clutch the drive, or pre-set as overload protection.

In a second fixed ratio embodiment (FIGS. 3a and 3b), which operates in the same manner as the first, the tether to restrain the transfer ring (36) from rotating against a wheel (33) is a number of coil springs (34) which attach the transfer ring to the unit housing allowing driving of the output (35). The transfer ring is provided with an internal channel (312) through which cooling fluid is circulated. The cooling fluid is supplied from to and from the reservoir by flexible pipes (313) running through the coil springs and is pumped by oscillation of the ring as described above.

In a third fixed ratio embodiment (FIGS. 4a and 4b), operating in the same manner as the first, the tether is provided by a bellows (41) connecting the transfer ring (46) to an outer casing (42). A partition (43) is provided in the transfer ring to seal the output (44) from the input side. Thus in operation no matter of any kind can pass from the input side or the output side and rotary power can be passed without the necessity of a rotating seal. This embodiment is supplied with two input wheels (44), by way of illustration of the variety of possibilities.

Figure 5A:
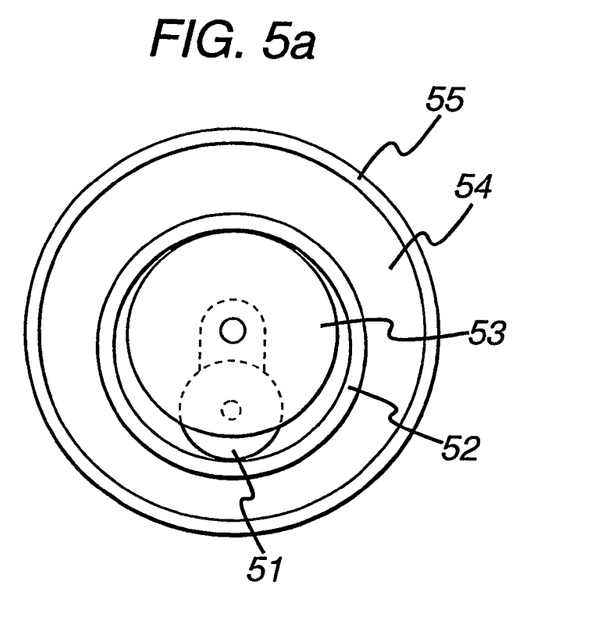
FIG. 5a shows a schematic end view of a fourth fixed ratio embodiment of the invention.
Figure 5B:
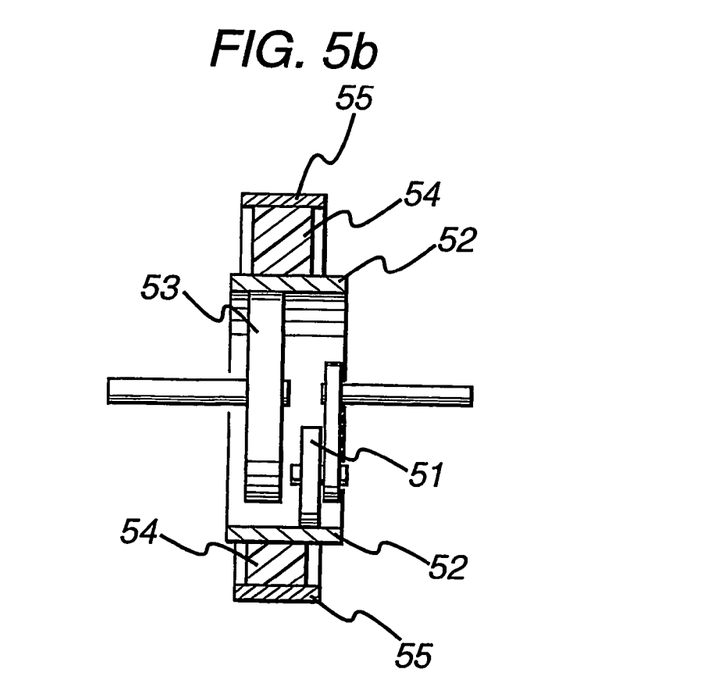

In a fourth fixed ratio embodiment (FIGS. 5a and 5b) operating in the same manner as the first an input wheel (51) is provided that rotates within the transfer ring (52) opposite the contact point between transfer ring and inner output wheel (53). The tether is supplied by a rubber ring (54) between the transfer ring and the casing (55). This embodiment is advantageously compact.

The use of pressure waves to drive piezo effect motors is known, but these do not employ a transfer ring to obtain a walking contra rotation effect and rely on direct frictional force to drive the output in the same direction as the pressure wave. In such motors it would be advantageous to use a transfer ring and so increase the torque output through reduction. In a similar manner the present invention may incorporate phased electromagnetic means to oscillate the transfer ring, which may contain permanent magnets.

Electric motors of known rotary and linear types work by the action of magnetic fields on other magnetic fields or on magnetic material. Both methods, as applied in all types of conventional rotary and linear electric motors, may be used to create an electric motor using a tethered oscillating ring in place of a rotor. Using an oscillating "rotor" or ring provides advantages of build cost and number of parts. Because the ring does not rotate, continuous access can be obtained to supply electrical current to the ring for energising electromagnetic coils without requiring brush slip rings. Also magnetic flux fields can be arranged to act from any direction on magnetic fields or material in the ring or that which is mounted on it, or induced in it. Thus one pole of a coil may act on one side of a disc shaped ring and the other pole on the other side, or one pole may act on the outside of a ring and the other pole on the inside.

Furthermore, because each molecule of the ring rotates in a circle whose circumference is equal to the contra rotation of the output per oscillation, the maximum velocity of any molecule is many times lower than in a conventional rotor. This lower speed enables the construction of extremely large diameter motors, without problems of force disintegration from high speed and mass that lead to structural failure in rotors of conventional electric motors. This oscillating principle of operation also enables the building of extremely fast switched motors with resulting high power density. Such a fast motor runs much cooler and more efficiently than a conventional rotary motor. Because the ring and stator coils roll on each other and do not have relative surface movement the air gap can be zero at some stages of flux generation, generating high forces, and requiring a smaller number of smaller coils for a particular load than a conventional electric motor.

Any method of building conventional rotary or linear electric motors can be adapted to building oscillating motors, for example, but not limited to using permanent magnets on the ring with static coils, or static permanent magnets and coils on the ring, or static coils inducing opposing fields in the ring, or coils on the ring inducing opposing fields in static elements.

Figure 8:
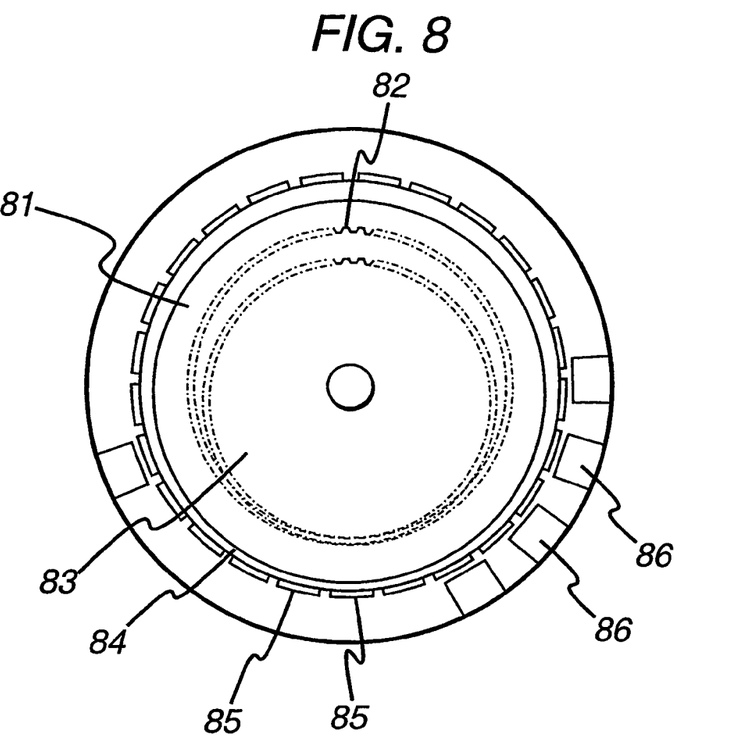
FIG. 8 is a schematic end view of a first embodiment of an induction type electric motor according to the invention.
Figure 9:
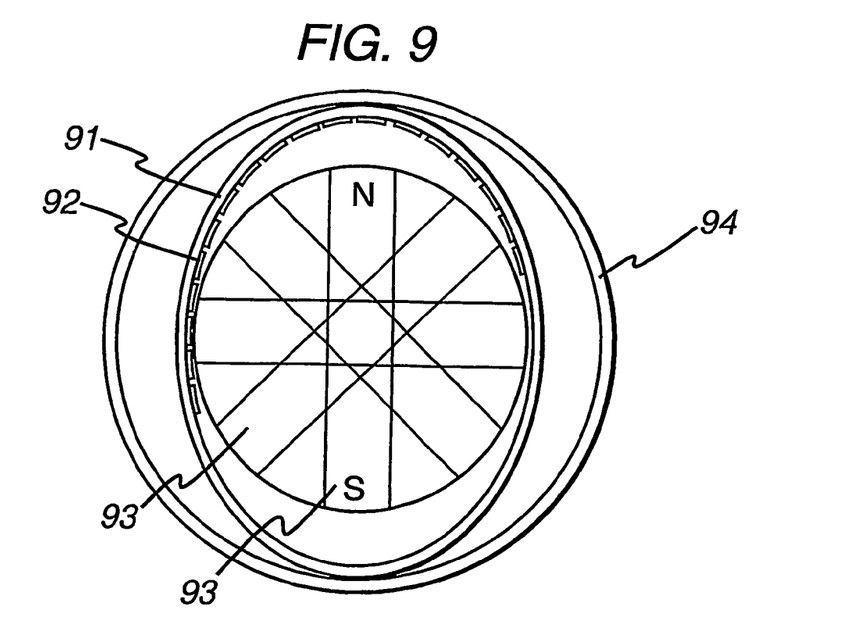
FIG. 9 is a schematic end view of a second embodiment of an induction type electric motor according to the invention.

This approach can be further understood from the embodiments shown in FIGS. 8 and 9.

In a simple (FIG. 8) embodiment of an induction type electric motor according to the principle of a rotating pressure force applied to an oscillating ring from outside the ring, there is provided a substantially rigid ring (81), compliantly tethered as described previously. The ring is provided with internal gearing (82) co-operating with an inner, smaller geared output (83). The ring is also provided with an encircling iron shielding layer (84) on which are mounted aluminium or copper sections (85), which may be discrete or shorted together around the ring. Electromagnetic stator coils (86) are provided round the ring, concentric with the output axis. These coils are switched on and off in sequence round the ring. When a coil is switched on it, its flux induces an opposing magnetic flux field in the neighbouring aluminium or copper section. Repulsive force between the fields pushes the ring inwards towards the output. This causes a contact area between transfer ring and output to roll around the output and drive it. The ring is restrained from rotation by mechanical or magnetic means for example a tether of the type described above and these means may also be used to ensure that the ring and output are in mesh even when the motor is not operating. Clearly such a motor can be operated in stepping mode.

In a second embodiment (FIG. 9) of an induction motor the transfer ring (91) is flexible and consists of a flexible steel ring (92) with aluminium or copper sections, which may be shorted together, attached to the inside of the ring. Inside the ring are provided static electromagnetic coils (93). Outside the ring is provided an output ring (94) operating on a fixed axis. The coils are switched on and off to provide one or more rotating magnetic fields, which repulse the flexible ring, creating waves in the flexible ring. The wave tops are at a radially greater distance from the centre of the motor and contact the output ring drive by frictional means to drive it. This motor will drive the external ring at near unity ratio in the direction of the wave travel.

Clearly the torque and output speed of electric motors of this kind may be varied by varying the relative dimensions of transfer ring and output in the ways described above.

The ratio of hypocycloidals is determined by the difference in the length of two interacting surfaces, which roll together. This effect is usually described as arising from the difference in number of teeth rather than difference in length as previous hypocycloidals have all been geared. The surfaces do not have to be endless or fixedly circular. A change in length of either interacting surface changes the ratio. The effect of walking a ring once around an inner wheel in a hypocycloidal manner without slipping is to produce a contra rotation in the inner ring equal to the difference in the interacting circumferences. From this it will be appreciated that hypocycloids give increasing reduction as the length of their interacting circumferences converge and vice-versa. For example, with a walking ring of inner circumference 65 mm and a driven wheel of 54 mm the reduction ratio is approximately 4.9:1. However if the driven wheel is expanded to 63.5 mm a ratio of approximately 36:1 is obtained. If the driven wheel is expanded to 64.5 mm a reduction ratio of 108:1 results. Thus, by expanding the radius of the output driven wheel by 18% a reduction ratio of approximately 22 times the original 4.9:1 ratio is achieved. This is a greater range than any other mechanical continuously variable drive. If a ratio range similar to an auto gearbox is required (5:1) and with overall drive-train reduction varying between 20:1 and 100:1 a radius change of less than 5% is required. Either changing the inner circumference of the transfer ring or the circumference of the inner driven wheel, or changing both, changes the ratio. Generally it will be preferred to change ratio by changing the transfer ring, because it wobbles rather than rotates. This enables easy access to the ring for actuation of the change. Locally varying the thickness between inner and outer circumferences of the transfer ring has the effect of a cam within each rotating of the input. This effect can be used to smooth torque and speed fluctuations in the input, such as when the motive power is supplied by an internal combustion engine.

Various methods of changing circumferences can be used, such as mechanical, hydraulic, pneumatic and electric actuators acting on either the transfer ring, the output wheel, or both.

Figure 6A:
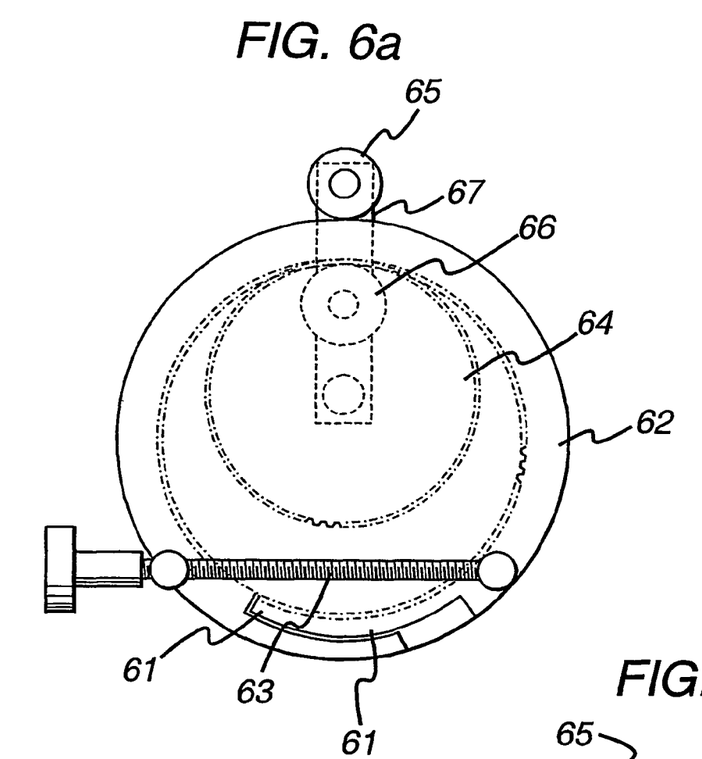
FIG. 6a shows a schematic end view of a first continuously variable ratio of the present invention.
Figure 6B:
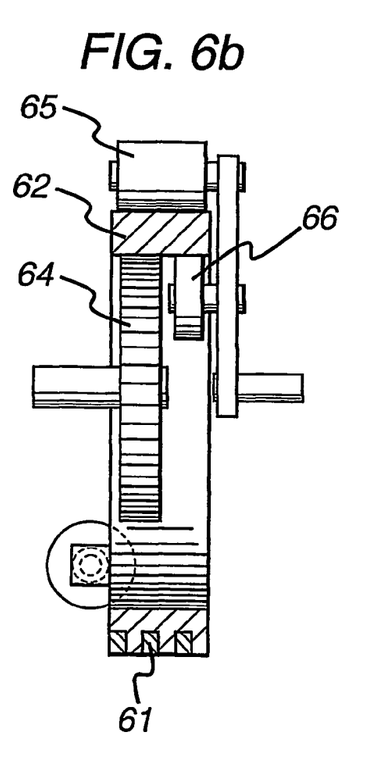

In a preferred embodiment (FIGS. 6a and 6b) overlapping ends (61) of an open transfer ring (62) are connected by a variable length screw actuator (63). The transfer ring is sandwiched in pressure contact between an inner output wheel (64) and outer (65) and inner (66) input wheels, mounted on an arm (67) on an input shaft (68) to rotate about the same axis as the inner output wheel. In operation the system rotates, oscillate and outputs reduced rotation as described above, but varying the length of the actuator changes the degree of overlap, thus changing the length of the inner circumference of the transfer ring and thereby changing the ratio. If the ratio is changing while the system is operating, the change should preferably be effected when the overlap is on the opposite side of the transfer ring from the point of contact between the transfer ring and the output wheel. The overlapping ends preferably comprise multiple interlocking fingers (69) which slide together and are sufficiently compliant to allow a smooth passage of the output wheel at all variable lengths. This layout may be frictional or positive. When positive the actuator must move in defined steps to ensure accurate registration of teeth etc. on the two overlapping ends of the transfer ring.

In a second preferred embodiment of a continuously variable version of the invention (FIGS. 7a and 7b) operating in the manner described above, the transfer ring comprises an elastic pneumatic tube (71), connected by a flexible tube (72) to a pneumatic controller (73). Rotating pressure is supplied by two input wheels (74) connected by a tension spring (75).

Figure 7A:
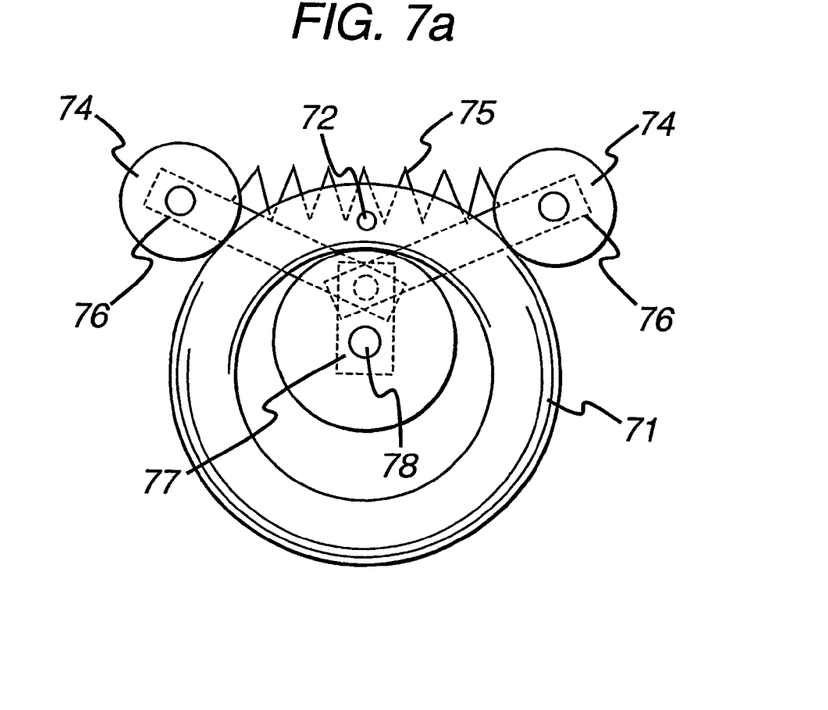
FIG. 7a shows a schematic end view of a second continuously variable ratio embodiment of the present invention.
Figure 7B:
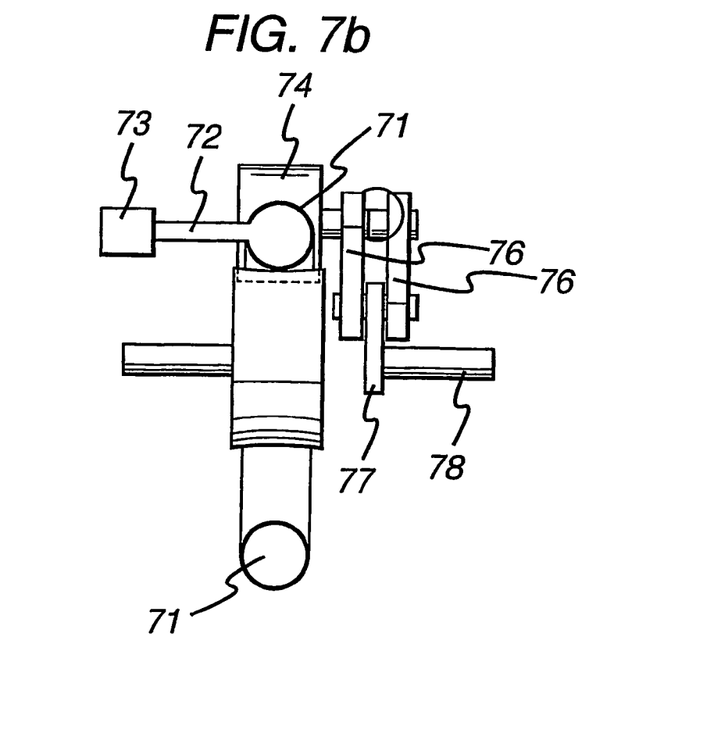

The wheels are mounted on arms (76), which are rotatably mounted on an arm (77) fixed to the input shaft (77). In operation the input shaft (78) rotates the wheels which are pressed against the transfer ring by the spring forcing them together. The transfer ring oscillates in the above described manner and transfers torque at reduced ratio to the output wheel. Increased reduction is achieved by the controller admitting more air to the transfer ring tube. This expands and reduces the inner circumference of the tube and so changes the ratio. The effect is reversed by allowing air out of the transfer tube and increasing the ratio. This embodiment would provide a reducer of low mass.

Figure 10A:
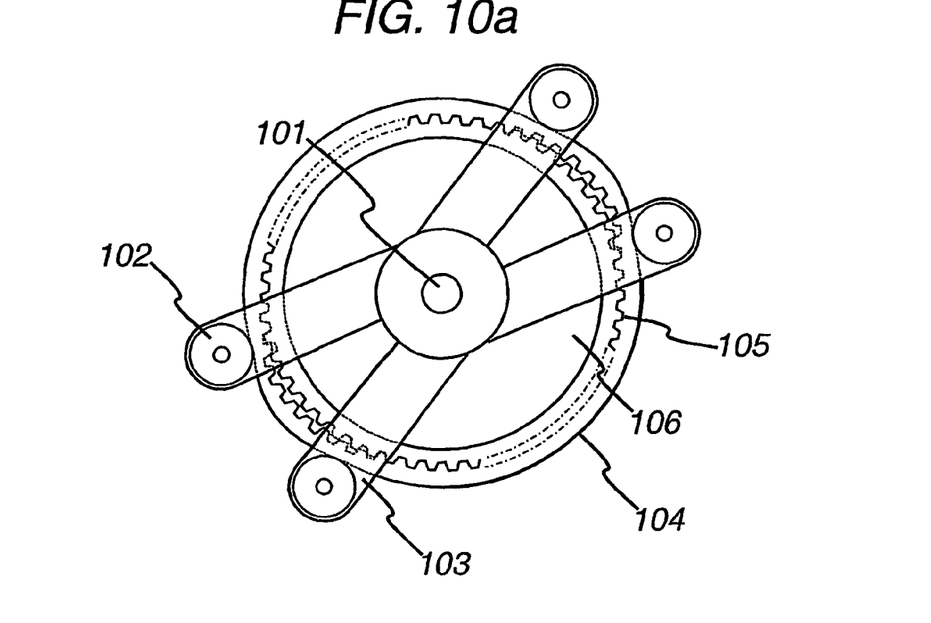
FIG. 10a is a schematic end view of a further embodiment of a fixed ratio device according to the present invention.
Figure 10B:
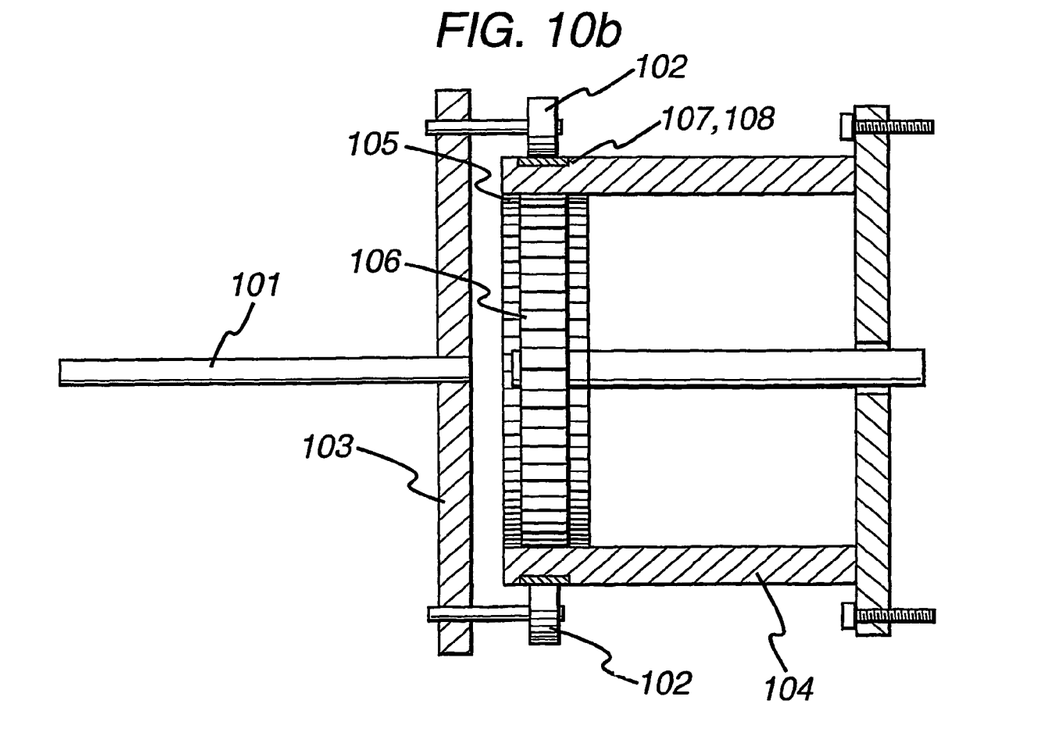

In a further embodiment of a fixed ratio device shown in FIGS. 10a and 10b there is provided first, a rotating input (101) on which are mounted more than two, but preferably four rollers (102), which may be moveable on a mount (103). The rollers are concentric with the input axis. Secondly there is provided a flexible and tethered transfer ring (104) which has internal gearing teeth (105) and encircles and co-operates with a geared output (106), which has fewer teeth. In operation the input rotates and the rollers roll around the transfer ring on a flexible pathway (107) that may be reinforced, for example by a flexible steel ring (108). The four rollers are installed so that the teeth on the transfer ring are pressed into engagement with the geared output between the rollers of opposing pairs of rollers but are unable to contact the inner output gear between the pairs because the length of flexible transfer ring between the pairs of rollers is greater than the corresponding length of toothed output between the pairs of rollers. Thus as the rollers roll round the ring loops (108) of non-contacting transfer ring travel round with the rollers. Drive is transmitted in contra direction to input in the usual way for hypocycloidals.

The outward bend at the ends of the loops help reduce engagement friction and noise between the output gear teeth and the teeth on the inside of the transfer ring.

By changing the output gear to a different size and changing the span of roller pairs the input to output ratio may be changed. The drive torque comes from the reaction of the tether and varies over the two areas of contacting teeth. It is greatest near the trailing roller of each pair and the roller, operating at a fixed circumference from the output axis, prevents tooth separation. Although the embodiment described is geared, it could also operate by frictional means.

Such a drive is compact and does not require lubrication. It has high torque capacity because of the large numbers of teeth engaged at any time and the fact that, unlike a belt drive, the torque is not transmitted just through a narrow reinforcing band above the teeth. Furthermore the rotating mass and the torque transmitted are equal on opposite sides of the output gear, providing a balanced load on the bearing and long life as well as vibration isolation between motor and load.

It will be appreciated that there are a large number of different permutations of features described in these preferred embodiments and that different features from different embodiments might be used in particular applications or juxtaposed or combined, without departing from the spirit of the invention. It will also be appreciated that the system described can be reversed to provide generation of increased rotary speed.

The invention claimed is:

1. An apparatus for providing a rotational output comprising a rotatable output element, a transfer element providing a traversable circuit relative to the rotatable output element, a constraint arranged to constrain the transfer element against rotation about its own axis but allow eccentric oscillation of the transfer element, and an input drive, in which the input drive is rotatable and arranged to cause oscillation of the transfer element by traversal thereof, relative to the rotatable output element, to provide a rotatable output, further comprising a frictional or positive coupling between any of the input drive, transfer element and output element.

2. An apparatus as claimed in claim 1 in which the transfer element has an inner and outer traversable circuit for respective traversal by one of the input drive and the output element.

3. An apparatus as claimed in claim 1 in which the transfer element has one of a traversable inner or outer circuit and the input drive and the output element traverse said circuit.

4. An apparatus as claimed in claim 1 comprising a plurality of input elements.

5. An apparatus as claimed in claim 4 in which first and second input elements are provided sandwiching a portion of the transfer element to traverse respective inner and outer circumferential circuits thereon.

6. An apparatus as claimed in claim 1 in which the input drive comprises a varying electromagnetic field drive or piezoelectric drive or fluid impulse drive.

7. An apparatus as claimed in claim 1 in which the transfer element comprises a variable geometry ring.

8. An apparatus as claimed in claim 7 in which the ring is a flexible ring.

9. n apparatus as claimed in claim 8 in which the input drive comprises at least one pair of rotatable input elements arranged to traverse an external circumference of the transfer element and disengage a region of the transfer element from the rotatable output element in the region between the input elements.

10. An apparatus as claimed in claim 9 in which the input elements are variably spaceable.

11. An apparatus as claimed in claim 7 in which the geometry of the ring is variable to vary the circumference of the traversable circuit.

12. An apparatus as claimed in claim 11 in which the ring includes a pair of ring ends moveable relative to one another to vary the circumference.

13. An apparatus as claimed in claim 11 in which the ring is inflatable to vary the circumference.

14. An apparatus as claimed in claim 7 in which the ring comprises a deformable portion and oscillation of the transfer element comprises translation of the deformable portion around the circumference of the ring.

15. An apparatus as claimed in claim 7 in which the transfer element is traversable throughout an inner circumference of the rotatable output element.

16. An apparatus as claimed in claim 1 further comprising a seal provided between the input drive and the rotatable output element.

17. An apparatus as claimed in claim 16 in which the seal extends across the transfer element.

18. An apparatus as claimed in claim 1 in which the transfer element is decouplable relative to one of the input drive and the rotatable output element.

19. An apparatus as claimed in claim 1 in which the constraint is releasable to allow rotation of the transfer element about its own axis to decouple the transfer element.

20. An apparatus as claimed in claim 1 in which the constraint comprises at least one of a ring, tube, membrane, flexible band, spring or bellows, or magnetic constraint.

21. An apparatus as claimed in claim 1 in which the transfer element is traversable throughout an inner circumference of the rotatable output element.

22. An apparatus as claimed in claim 1 in which the rotatable output element comprises a rotating electromagnetic field.

23. An apparatus as claimed in claim 1 comprising an apparatus for providing a greater than or less than unity ratio between input and output rotational speed, or for coupling a rotational input to a rotational output.

24. A transmission, drive, reducer, generator or motor or engine comprising an apparatus as claimed in claim 1.

* * * * *

UNITED STATES PATENT AND TRADEMARK OFFICE
CERTIFICATE OF CORRECTION

PATENT NO. : 7,549,357 B2 Page 1 of 1
APPLICATION NO. : 10/551398
DATED : June 23, 2009
INVENTOR(S) : John P. R. Hammerbeck It is certified that error appears in the above-identified patent and that said Letters Patent is hereby corrected as shown below:

Column 8
Claim 9, line 25, "n" should be --An--.

Signed and Sealed this

Thirteenth Day of October, 2009

David J. Kappos
*Director of the United States Patent and Trademark Office*